L. STOLLERMAN.
ARTICLE OF TABLEWARE.
APPLICATION FILED NOV. 18, 1919.
1,419,591. Patented June 13, 1922.
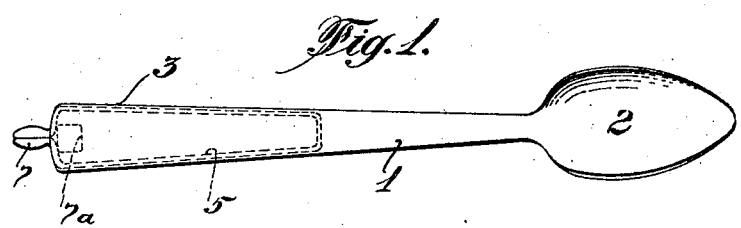
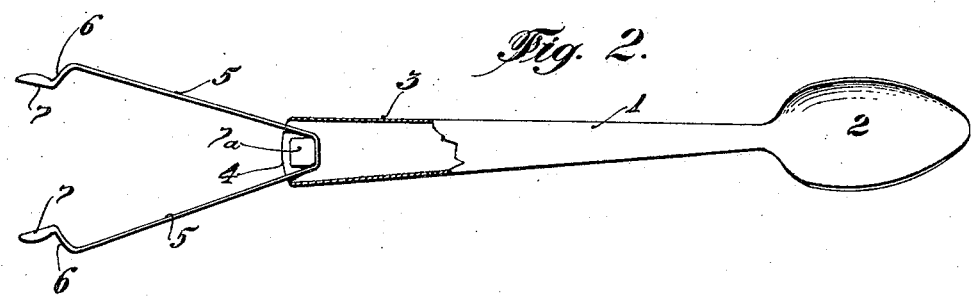
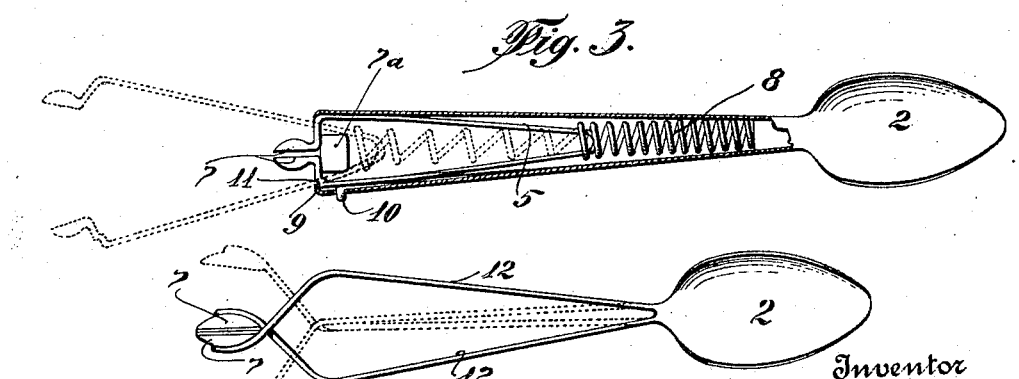
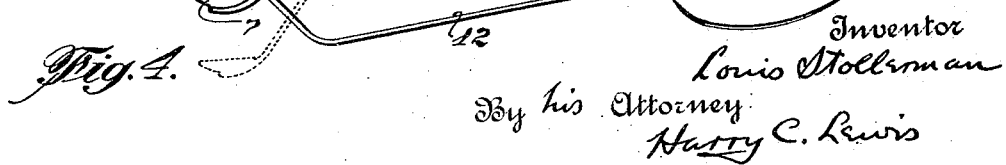
Inventor
Louis Stollerman
By his Attorney
Harry C. Lewis

UNITED STATES PATENT OFFICE.

LOUIS STOLLERMAN, OF BROOKLYN, NEW YORK.

ARTICLE OF TABLEWARE.

1,419,591. Specification of Letters Patent. Patented June 13, 1922.

Application filed November 18, 1919. Serial No. 338,906.

*To all whom it may concern:*

Be it known that I, LOUIS STOLLERMAN, a citizen of the United States of America, residing at the borough of Brooklyn, city of New York, county of Kings, State of New York, have invented new and useful Improvements in Articles of Tableware, of which the following is a specification.

My invention relates to an article of tableware and more particularly to combined spoons and sugar tongs.

Heretofore at dining tables, separate tea or sugar spoons and sugar tongs have been used with granulated or lump sugar. In cases where lump sugar has been used, but no sugar tongs provided, some little difficulty has been found in taking lumps of sugar from a bowl with an ordinary spoon, and as a result, the unsanitary custom of taking the lumps of sugar with the fingers has grown up. Many devices have been tried out and put to use, such as packaging each lump or piece of sugar in a sealed sanitary wrapping, automatic sugar containers delivering a single piece of sugar at a time, and many others, all of which, have been and are serving their purpose, but which are too expensive for ordinary use.

An object of my invention is to avoid the necessity of any special wrappings or special containers, and at the same time provide sanitary means for accomplishing the same purpose.

A further object of my invention is to produce an article that is adapted to be used for lump or granulated sugar.

Another object is the production of a combined spoon and sugar tongs so made that the contour and beauty is not destroyed, and the tongs when in closed position appears to be a part of the spoon.

Other objects are inexpensiveness and facility of manufacture.

Other objects and advantages will hereinafter appear from the following description.

I will now describe the embodiments of my invention illustrated in the accompanying drawings after which I shall point out my invention in claims.

Figure 1 is a plan of my combined spoon and sugar tongs showing the tongs in closed position;

Fig. 2 is a plan of my combined spoon and sugar tongs with portions broken away showing the tongs in open position;

Fig. 3 is a plan of my invention showing automatic means for releasing the sugar tongs; and Fig. 4 is a plan of a modification of my invention.

The embodiment of my invention illustrated in the drawing consists of a spoon 1 of usual or ordinary shape having a bowl 2 and handle 3. The handle 3 is of hollow or tubular construction and is open at its end 4. A flexible springy wire 5, substantially V-shaped to correspond to the contour of the hollow handle 3, is inserted therein. The ends 6 of the wire 5 are turned or bent inwardly so as to meet and conform substantially in shape to the end 4 of the handle 3 of the spoon. Clamping members or jaws 7 are secured to the ends 6 of the wire 5 and are as shown in Figs. 1 and 2. The ends 6 of the wire 5 fit in the end of the handle forming a substantially smooth or flush surface. The clamping jaws 7 also fit together smoothly and evenly. The wire 5 and clamping jaws 7 form the sugar tongs. A block 7ª is preferably inserted and rigidly fixed in the handle 3 near its end 4 after the insertion of the wire 5 which prevents the wire 5 from being entirely withdrawn from the handle or entirely pushed within it.

The tongs when in closed position, as shown in Fig. 1, are practically hidden from view, the jaws 7 merely forming a ball-like ornamentation at the end of the spoon. When it is desired to use the device to take lump sugar, the tongs are partially withdrawn as shown in Fig. 2 and used, and then replaced. It will be seen from the above description that the device is therefore usable as an ordinary spoon and as sugar tongs.

The embodiment of my invention shown in Fig. 3, provides means for automatically releasing the tongs of my device. Such releasing means comprise a spring member 8 in the handle 3 between the inner end of the wire 5 and the bowl 2. A lug or projection 9 is formed on the side of the handle 3 at the end 4, and push-button 10 is provided adapted to bear against the wire 5. A notch 11 is formed in the wire 5 adapted to fit the lug or projection 9. When the tongs are inserted in the spoon, the lug 9 holds it in closed position against the action of the spring 8. When it is desired to use the tongs, the push-button 10 is pressed, disengaging the notch 11 from the projection 9, and the spring 8 immediately forces the tongs into open position as shown in dotted lines. A slight clearance should be provided between the clamping jaws 7 to allow for movement of the push-button against the wire 5.

The modification shown in Fig. 4 comprises a spoon bowl 2 having a handle consisting of flexible springy wires 12, terminating in sugar tongs 7. The open position of the tongs is shown in dotted lines.

It is obvious that various modifications may be made in the construction above particularly described without departing from the nature and scope of my invention.

I claim:

1. A sugar tongs comprising a hollow handle, tongs adapted to fit therein, and releasing means for automatically withdrawing the tongs.

2. The combination with a casing, of resilient tongs adapted to be enclosed thereby, a block fixed within said casing, one side of the block adapted to co-operate with the tongs to prevent their withdrawal from the handle, and another side of the block adapted to engage the tongs to preclude their insertion in the casing more than a predetermined amount.

3. An article of tableware comprising a hollow handle, a substantially V-shaped member having flattened outer ends slidable in the hollow handle, and a retaining member in the hollow handle.

4. An article of tableware comprising a hollow handle, a substantially V-shaped member slidable in the hollow handle, shoulders provided on each arm of the V-shaped member, an inwardly extending lip on one side of the hollow handle adapted to receive and hold the V-shaped member in place when it is within the handle, and a retaining member positioned in and secured to the hollow handle adapted to prevent the V-shaped member from being entirely withdrawn from the hollow handle.

5. An article of tableware comprising a hollow handle, tongs slidable in the hollow handle, a spring in the hollow handle located back of the tongs and pressing against the same, an inwardly turned lip provided on the open end of the hollow handle adapted to engage and hold the tongs in closed position, a push-button located at the same side of the hollow handle as the inwardly turned lip, such push-button being adapted to press against the tongs and release it from engagement with the lip so that the spring will cause the tongs to be partially ejected from the handle, and a retaining block secured within the handle to prevent the tongs from being entirely withdrawn.

In testimony whereof, I have signed my name to this specification this 11th day of November, 1919.

LOUIS STOLLERMAN.